(12) United States Patent
Bozak et al.

(10) Patent No.: US 8,135,841 B2
(45) Date of Patent: Mar. 13, 2012

(54) METHOD AND SYSTEM FOR MAINTAINING A GRID COMPUTING ENVIRONMENT HAVING HIERARCHICAL RELATIONS

(75) Inventors: Erol Bozak, Pforzheim (DE); Alexander Gebhart, Bad Schoenborn (DE)

(73) Assignee: SAP AG, Walldorf (DE)

( * ) Notice: Subject to any disclaimer, the term of this patent is extended or adjusted under 35 U.S.C. 154(b) by 83 days.

(21) Appl. No.: 12/326,441

(22) Filed: Dec. 2, 2008

(65) Prior Publication Data

US 2009/0083425 A1 Mar. 26, 2009

Related U.S. Application Data

(62) Division of application No. 10/712,155, filed on Nov. 12, 2003, now Pat. No. 7,594,015.

(60) Provisional application No. 60/490,818, filed on Jul. 28, 2003.

(51) Int. Cl.
G06F 15/16 (2006.01)
G06F 15/173 (2006.01)

(52) U.S. Cl. ................. 709/226; 709/201; 709/223

(58) Field of Classification Search .......... 709/221, 709/201–202, 223–226
See application file for complete search history.

(56) References Cited

U.S. PATENT DOCUMENTS

| | | | |
|---|---|---|---|
| 5,276,789 A | 1/1994 | Besaw et al. | |
| 5,440,722 A | 8/1995 | VanderSpek et al. | |
| 5,539,883 A | 7/1996 | Allon et al. | |
| 5,572,724 A | 11/1996 | Watanabe et al. | |
| 5,659,694 A | 8/1997 | Bibayan | |
| 5,699,532 A | 12/1997 | Barrett et al. | |
| 5,761,429 A | 6/1998 | Thompson | |
| 5,784,552 A | 7/1998 | Bishop et al. | |
| 5,983,310 A | 11/1999 | Adams | |
| 5,996,012 A | 11/1999 | Jarriel | |
| 6,009,455 A | 12/1999 | Doyle | |
| 6,061,505 A | 5/2000 | Pitchaikani et al. | |
| 6,098,108 A | 8/2000 | Sridhar et al. | |
| 6,182,086 B1 | 1/2001 | Lomet et al. | |
| 6,209,018 B1 | 3/2001 | Ben-Shachar et al. | |
| 6,226,675 B1 | 5/2001 | Meltzer et al. | |
| 6,256,740 B1 | 7/2001 | Muller et al. | |
| 6,289,382 B1 | 9/2001 | Bowman-Amuah | |
| 6,385,639 B1 | 5/2002 | Togawa | |

(Continued)

FOREIGN PATENT DOCUMENTS

JP 05-216845 8/1993

(Continued)

OTHER PUBLICATIONS

"Caching in on the Enterprise Grid Turbo-Charge Your Applications with OracleAS Web Cache," An Oracle Technical White Paper, <<http://www.oracle.com/technology/products/ias/web_cache/pdf/WebCache1012_twp.pdf>>, Feb. 7, 2006.

(Continued)

Primary Examiner — Joshua Joo
(74) Attorney, Agent, or Firm — Finnegan, Henderson, Farabow, Garrett & Dunner LLP

(57) ABSTRACT

A method includes, in a grid computing environment, maintaining systems having grid managers having hierarchical relations, the relations of each grid manager stored in each of the systems. Each of these hierarchical relations are classified as superior or inferior.

11 Claims, 8 Drawing Sheets

U.S. PATENT DOCUMENTS

| | | | |
|---|---|---|---|
| 6,401,097 B1 | 6/2002 | McCotter et al. | |
| 6,430,609 B1 | 8/2002 | Dewhurst et al. | |
| 6,453,349 B1 | 9/2002 | Kano et al. | |
| 6,466,980 B1 | 10/2002 | Lumelsky et al. | |
| 6,502,131 B1 | 12/2002 | Vaid et al. | |
| 6,567,838 B1 | 5/2003 | Korenshtein | |
| 6,574,635 B2 | 6/2003 | Stauber et al. | |
| 6,615,278 B1 | 9/2003 | Curtis | |
| 6,628,304 B2 | 9/2003 | Mitchell et al. | |
| 6,650,347 B1 | 11/2003 | Nulu et al. | |
| 6,751,795 B1 | 6/2004 | Nakamura | |
| 6,766,365 B1* | 7/2004 | Huang et al. | 709/223 |
| 6,775,830 B2 | 8/2004 | Matsunami et al. | |
| 6,789,170 B1 | 9/2004 | Jacobs et al. | |
| 6,799,251 B1 | 9/2004 | Jacobs et al. | |
| 6,813,637 B2 | 11/2004 | Cable | |
| 6,813,763 B1 | 11/2004 | Takahashi et al. | |
| 6,816,944 B2 | 11/2004 | Peng | |
| 6,826,568 B2 | 11/2004 | Bernstein et al. | |
| 6,832,220 B1 | 12/2004 | Rahman | |
| 6,834,301 B1 | 12/2004 | Hanchett | |
| 6,859,834 B1 | 2/2005 | Arora et al. | |
| 6,912,587 B1 | 6/2005 | O'Neil | |
| 6,918,113 B2 | 7/2005 | Patel et al. | |
| 6,967,728 B1 | 11/2005 | Vidyanand | |
| 6,976,258 B1 | 12/2005 | Goyal et al. | |
| 7,010,596 B2 | 3/2006 | Bantz et al. | |
| 7,051,107 B2 | 5/2006 | Morikawa | |
| 7,093,243 B2 | 8/2006 | Bailey et al. | |
| 7,096,248 B2 | 8/2006 | Masters et al. | |
| 7,103,594 B1 | 9/2006 | Wolfe | |
| 7,124,062 B2 | 10/2006 | Gebhart | |
| 7,127,518 B2* | 10/2006 | Vange et al. | 709/230 |
| 7,130,891 B2 | 10/2006 | Bernardin et al. | |
| 7,171,470 B2* | 1/2007 | Doyle et al. | 709/225 |
| 7,171,654 B2 | 1/2007 | Werme et al. | |
| 7,181,743 B2 | 2/2007 | Werme et al. | |
| 7,185,046 B2 | 2/2007 | Ferstl et al. | |
| 7,185,077 B1* | 2/2007 | O'Toole et al. | 709/223 |
| 7,234,032 B2 | 6/2007 | Durham et al. | |
| 7,290,048 B1 | 10/2007 | Barnett et al. | |
| 7,302,425 B1 | 11/2007 | Bernstein et al. | |
| 7,322,031 B2 | 1/2008 | Davis et al. | |
| 7,328,406 B2 | 2/2008 | Kalinoski et al. | |
| 7,490,073 B1 | 2/2009 | Qureshi et al. | |
| 7,509,412 B2 | 3/2009 | Creamer et al. | |
| 7,546,598 B2 | 6/2009 | Blumenthal et al. | |
| 7,559,060 B2 | 7/2009 | Schmidt et al. | |
| 7,574,661 B2 | 8/2009 | Matsuura et al. | |
| 7,676,560 B2 | 3/2010 | McCollum | |
| 2001/0049594 A1 | 12/2001 | Klevans | |
| 2001/0054034 A1 | 12/2001 | Arning et al. | |
| 2002/0019844 A1 | 2/2002 | Kurowski et al. | |
| 2002/0019864 A1* | 2/2002 | Mayer | 709/223 |
| 2002/0078209 A1 | 6/2002 | Peng | |
| 2002/0083183 A1 | 6/2002 | Pujare et al. | |
| 2002/0095434 A1 | 7/2002 | Lane | |
| 2002/0099772 A1* | 7/2002 | Deshpande et al. | 709/204 |
| 2002/0167954 A1 | 11/2002 | Highsmith et al. | |
| 2002/0174189 A1 | 11/2002 | Peng | |
| 2002/0194251 A1 | 12/2002 | Richter et al. | |
| 2003/0005068 A1 | 1/2003 | Nickel et al. | |
| 2003/0033369 A1 | 2/2003 | Bernhard | |
| 2003/0041130 A1 | 2/2003 | Harrisville-Wolff et al. | |
| 2003/0041142 A1 | 2/2003 | Zhang et al. | |
| 2003/0088580 A1 | 5/2003 | Desai et al. | |
| 2003/0093527 A1* | 5/2003 | Rolia | 709/226 |
| 2003/0093528 A1 | 5/2003 | Rolia | |
| 2003/0101331 A1 | 5/2003 | Boylan et al. | |
| 2003/0126196 A1 | 7/2003 | Lagimonier et al. | |
| 2003/0126265 A1 | 7/2003 | Aziz et al. | |
| 2003/0197726 A1 | 10/2003 | Weitzman | |
| 2003/0225880 A1* | 12/2003 | Srivastava et al. | 709/224 |
| 2004/0059963 A1* | 3/2004 | Simonnet et al. | 714/47 |
| 2004/0078455 A1* | 4/2004 | Eide et al. | 709/223 |
| 2004/0162905 A1* | 8/2004 | Griffin et al. | 709/229 |
| 2004/0179481 A1 | 9/2004 | Graupner | |
| 2004/0194084 A1 | 9/2004 | Matsunami et al. | |
| 2004/0215590 A1 | 10/2004 | Kroening | |
| 2004/0215614 A1* | 10/2004 | Doyle et al. | 707/8 |
| 2004/0215973 A1 | 10/2004 | Kroening | |
| 2004/0225711 A1 | 11/2004 | Burnett et al. | |
| 2004/0255291 A1 | 12/2004 | Sierer et al. | |
| 2004/0261053 A1 | 12/2004 | Dougherty et al. | |
| 2004/0268147 A1 | 12/2004 | Wiederin et al. | |
| 2004/0268293 A1 | 12/2004 | Woodgeard | |
| 2005/0015437 A1 | 1/2005 | Strait | |
| 2005/0015643 A1 | 1/2005 | Davis et al. | |
| 2005/0027785 A1 | 2/2005 | Bozak et al. | |
| 2005/0027812 A1 | 2/2005 | Bozak et al. | |
| 2005/0027813 A1 | 2/2005 | Bozak et al. | |
| 2005/0027843 A1 | 2/2005 | Bozak et al. | |
| 2005/0027864 A1 | 2/2005 | Bozak et al. | |
| 2005/0027865 A1 | 2/2005 | Bozak et al. | |
| 2005/0044251 A1 | 2/2005 | Bozak et al. | |
| 2005/0060272 A1 | 3/2005 | Lin | |
| 2005/0060349 A1 | 3/2005 | Shirin et al. | |
| 2005/0076105 A1 | 4/2005 | Keohane et al. | |
| 2005/0076339 A1 | 4/2005 | Merril et al. | |
| 2005/0125537 A1 | 6/2005 | Martins et al. | |
| 2005/0131898 A1 | 6/2005 | Fatula, Jr. | |
| 2005/0138156 A1 | 6/2005 | Gebhart et al. | |
| 2005/0138618 A1 | 6/2005 | Gebhart | |
| 2005/0149294 A1 | 7/2005 | Gebhart | |
| 2005/0160107 A1 | 7/2005 | Liang | |
| 2005/0160423 A1 | 7/2005 | Bantz et al. | |
| 2005/0165912 A1 | 7/2005 | Colbeck et al. | |
| 2005/0183143 A1 | 8/2005 | Anderholm et al. | |
| 2005/0235055 A1 | 10/2005 | Davidson | |
| 2005/0262506 A1 | 11/2005 | Dawson et al. | |
| 2006/0005181 A1 | 1/2006 | Fellenstein et al. | |
| 2006/0015285 A1 | 1/2006 | Fuller et al. | |
| 2006/0020628 A1 | 1/2006 | Huberman et al. | |
| 2006/0036763 A1* | 2/2006 | Johnson et al. | 709/238 |
| 2006/0075070 A1 | 4/2006 | Merissert-Coffinieres et al. | |
| 2006/0136506 A1 | 6/2006 | Gebhart et al. | |
| 2006/0168158 A1 | 7/2006 | Das | |
| 2006/0168174 A1 | 7/2006 | Gebhart et al. | |
| 2006/0218301 A1* | 9/2006 | O'Toole et al. | 709/244 |
| 2006/0277271 A1 | 12/2006 | Morse et al. | |
| 2006/0294238 A1 | 12/2006 | Naik et al. | |
| 2008/0052729 A1 | 2/2008 | Paul et al. | |
| 2008/0222234 A1 | 9/2008 | Marchand | |
| 2009/0007131 A1 | 1/2009 | Woodgeard | |
| 2009/0113395 A1 | 4/2009 | Creamer et al. | |
| 2009/0210826 A1 | 8/2009 | Sierer et al. | |
| 2009/0282404 A1 | 11/2009 | Khandekar et al. | |

FOREIGN PATENT DOCUMENTS

| | | |
|---|---|---|
| JP | 07-311743 | 11/1995 |
| JP | 08-055059 | 2/1996 |
| JP | 08314872 | 11/1996 |
| JP | 10-105383 | 4/1998 |
| JP | 2000-078156 | 3/2000 |
| JP | 2001-331321 | 11/2001 |
| JP | 2002-132407 | 5/2002 |
| JP | 2002-528797 | 9/2002 |
| JP | 2004-508616 | 3/2004 |
| WO | WO 01/13227 A2 | 2/2001 |
| WO | WO 02/03203 A2 | 1/2002 |

OTHER PUBLICATIONS

"eserver xSeries 335 Type 8676 User's Guide," Feb. 2003, IBM Product User's Guide, Chapter 1, pp. 1-12.

"hp blade server data sheet," HP Blade Server Data Sheet, Nov. 2001, pp. 2-6.

"IBM eserver xSeries 335," Publication date unknown, IBM Data Sheet, accessed online on 12/27 at <http://www.ibm.com/servers/uk/eserver/xseries/literature/xseries_335.html>, 2 pages.

Ali et al., "Predicting the Resource Requirements of a Job Submission," California Institute of Technology, pp. 1-4, 2004.

Allcock, et al., "GridMapper: A Tool for Visualizing the Behavior of Large-Scale Distributed Systems," Proceedings 11th IEEE International Symposium on High Performance Distributed Computing IEEE Comput. Soc., Piscataway, NJ, pp. 179-187, Jul. 2002.

Allen, et al., "The Cactus Worm: Experiments With Dynamic Resource Discovery and Allocation in a Grid Environment," International Journal of High Performance Computing Applications Sage Science Press, vol. 15, No. 4, pp. 345-358, 2001.

Baldridge, Kim K. et al., "QMView and GAMESS: Integration into the World Wide Computational Grid," IEEE, pp. 1-25, 2002.

Berman et al., "The GrADS Project: Software Support for High-Level Grid Application Development," International Journal of High Performance Computing Applications, Sage Science Press, vol. 15, No. 4, pp. 327-344, Jul. 31, 2001.

Braden, R. et al., "Resource ReSerVation Protocol (RSVP), Version 1 Functional Specification," Aug. 12, 1996.

Cactus 4.0, User's Guide, Rev. 1.45, Chapter D9, dated Jan. 19, 2004 (3 pages).

Chase, Jeffrey S., et al., "Dynamic Virtual Clusters in a Grid Site Manager," High Performance Distributed Computing, 2003, Proceedings 12th IEEE International Symposium on Jun. 22-24, 2003, pp. 90-100.

Czajkowski, Karl et al., "Resource Co-Allocation in Computational Grid: High-Performance Distributed Computing Archive," Proceedings of the 8th IEEE International Symposium on High Performance Distributed Computing Table of Contents, 1999.

Eerola, P., et al., "The NorduGrid Architecture and Tools," Retrieved from the Internet: http://www.nordugrid.org, Mar. 2002.

El-Ghazawi, Tarek et al., "A Performance Study of Job Management Systems," Concurrency and Computation: Practice and Experience, John Wiley & Sons, Ltd., pp. 1229-1246, vol. 16 Issue 13, Oct. 2004.

European Examination Report, dated Aug. 1, 2007, for corresponding EP Application No. 05 027 222.8 (5 pages).

European Search Opinion, dated May 18, 2006, for corresponding EP Application No. 05 027 222.8 (5 pages).

European Search Report dated Mar. 1, 2006 pertaining to Application No. 05027221.0-2211.

European Search Report dated Mar. 13, 2006 pertaining to Application No. 05027543.7-2211, 7 pages.

European Search Report for Application No. 05027222.8, dated May 18, 2006 (9 pages).

Foster, Ian et al., "A Distributed Resource Management Architecture that Supports Advance Reservations and Co-allocation," IEEE 1999.

Foster, Ian et al., "The Anatomy of the Grid: Enabling Scalable Virtual Organizations," The International Journal of High Performance Computing Applications, vol. 5, No. 3, Fall 2001.

Gianella, et al., "Grid Checkpointing in the European DataGrid Project," Oct. 16, 2002 (5 pages).

Goodale et al., "Checkpoint/Recovery in Cactus 4.0," Oct. 16, 2002 (7 pages).

International Search Report for PCT/EP2004/008406, dated Dec. 28, 2004, 7 pgs.

International Search Report for PCT/EP2004/008407, dated Jan. 19, 2005, 6 pgs.

International Search Report for PCT/EP2004/008408, dated Mar. 21, 2005, 16 pgs.

International Search Report for PCT/EP2004/008409, dated Dec. 29, 2004, 6 pgs.

International Search Report for PCT/EP2004/008449, dated Jan. 19, 2005, 6 pgs.

Jang et al., "A Path Based Internet Cache Design for GRID Application," Lecture Notes in Computer Science, Dec. 2003, pp. 455-458.

Jitsumori, Hitoshi, "Beginning of the Grid Computing Era," Nikkei Internet Solutions, vol. 69, pp. 81-89, Nikkei Business Publications, Inc., Mar. 22, 2003.

Jitsumori, Hitoshi, "Concentrated Control of a Plurality of Computers as One System," Nikkei Internet Technology, vol. 59, p. 14-15, Nikkei Business Publications, Inc., May 22, 2002.

Konya, B., "The NorduGrid Information System," Retrieved from the Internet: http://www.nordugrid.org, Sep. 16, 2002.

Lacan, Francis, "A Perfect World? A model for transormation," IBM Business Consultilng Services, 1-12, (Apr. 2003).

Lee et al., "visPerf. Monitoring Tool for Grid Computing," Retrieved from the Internet: http://icl.cs.utk.edu.projectsfiles/netsolve/pubs/visperf.pdf, pp. 1-13, Jun. 2003.

Li et al., "Improving Performance via Computational Replication on a Large-Scale Computational Grid," Proceedings of the 3rd IEEE/ACM International Symposium on Cluster Computing and the Grid, 2003, pp. 1-7.

Limaye, K. et al., "Grid aware HA-OSCAR," high Performance Computing Systems and Applications, 2005. HPCS 2005. 19th International Symposium on, Vol. No. pp. 333-339, May 15-18, 2005.

Liu, Chuang et al., "Design and Evaluation of a Resource Selection Framework for Grid Applications," High Performance Distributed Computing 2002, HPDC-11, 2002, Proceedings 11th IEEE International Symposium, Jul. 23-26, 2002, pp. 63-72.

Min, et al., "A CICS to Linux Grid Implementation," IBM Corporation, Redbooks Paper, 1-24 (2003).

Nabrzyski Jared et al., "Grid Resource Management, State of the Art and Future Trends," Sep. 2003, Kluwer Academic Publishers.

Official Notice of Rejection mailed on Apr. 10, 2009 of Japanese Patent Application No. 2006-521509, (2 pages) and translation thereof (3 pages).

Official Notice of Rejection mailed on Apr. 14, 2009 of Japanese Patent Application No. 2006-521512, (5 pages) and translation thereof (6 pages).

Official Notice of Rejection mailed on Apr. 21, 2009 of Japanese Patent Application No. 2006-521513, (2 pages) and translation thereof (3 pages).

Official Notice of Rejection mailed on Apr. 24, 2009 of Japanese Patent Application No. 2006-521515, (3 pages) and translation thereof (4 pages).

Rajkumar Buyya; Nimrod/G., "An Architecture for a Resource Management and Scheduling System in a Global Computational Grid," IEEE Computer Society Press, USA, 2000.

Rajkumar, Buyya, "Economic-based Distributed Resource Management and Scheduling for Grid Computing," Apr. 2002.

Smith, Gordon, "Oracle RAC 10g Overview," An Oracle White Paper, Oracle Corporation, 1-15 (Nov. 2003).

Soulder, Benny, "On the Grid," Oracle Corporation, 1-4 (2004).

Special Edition Using Microsoft Excel 2000, Copyright 1999 by Que Corpl. p. 67-68.

Tierney, et al., White Paper: A Grid Monitoring Service Architecture (DRAFT), Retrieved from the internet http://citeseer.ist.psu.edu/530951.htm, Feb. 2001.

Ting et al., "3LS: A Peer-to-Peer Network Simulator," Copyright Sep. 2003.

Vadhiyar et al., "A Performance Oriented Migration Framework for the Grid," Proceedings of the Third IEEE/ACM International Symposium on Cluster Computing and the Grid IEEE Comput. Soc., Los Alamitos, CA, pp. 130-137, May 2003.

Von Laszewski et al., "InfoGram: A Grid Service that Supports Both Information Queries and Job Execution," 2002, pp. 333-342, IEEE Computer Society, Proceedings of the 11th International Symposium on High Performance Distributed Computing, (HPDC '02).

Von Laszewski, et al., "Designing Grid-based Problem Solving Environments and Portals," Proceedings of the 34th Annual Hawaii International Conference on System Sciences IEEE Comp. Soc., Los Alamitos, CA, pp. 1-10, Jan. 2001.

Von Laszewski, et al., "Grid-Based Asynchronous Migration of Execution Context in Java Virtual Machines," Euro-Par 2000 Parallel Processing, 6th International Euro-Par Conference Proceedings, Lecture Notes in Computer Science, vol. 1900, pp. 22-34, Sep. 2000.

Von Laszewski, G., et al., "CoG Kits: A Bridge Between Commodity Distributed Computing and High-Performance," Retrieved from the Internet: http://www-unix.mcs.anl.gov, Jun. 2000.

Waananen, et al., "An Overview of an Architecture Proposal for a High Energy Physics Grid," Applied Parallel Computing, Advanced Scientific Computing, 6th International Conference, pp. 76-86, Jun. 2002.

Walsh, et al., "Staged Simulation for Improving Scale and Performance of Wireless Network Simulations," Institute of Electrical and Electronics Engineers, Proceedings of the 2003 Winter Simulation Conference, New Orleans, Dec. 7-10, 2003, IEEE, vol. 2 of 2, pp. 667-675.

Zenses, Ralf, "N1 Grid Advanced Architecture for SAP Operating concept for SAP Infrastructure," Germany/Austria Sun Microsystems GmbH, Mar. 5, 2004, pp. 1-34.

Zhang et al., "Fault-tolerant Grid Services Using primary-Backup: Feasibility and Performance," Cluster Computing, 2004 IEEE International Conference, San Diego, CA Sep. 20-23, 2004, pp. 105-114.
"About Grid Computing," Retrieved from the Internet: http://www-1.ibm.com/grid/about_grid/index.shtml, 1 page.
"FAQ," Retrieved from the Internet: http://www-1.ibm.com/grid/about_grid//faq.shtml, 1-4.
"Grid Benefits," Retrieved from the Internet: http://www-1.ibm.com/grid/about_grid/benefits.shtml, 1-2.
"Grid Computing Q&A with Benny Souder, Vice President, Distributed Database Development, Database and Application Server Technologies," 1-9.
"How Sun™ Grid Engine, Enterprise Edition 5.3 Works," Policy Systems in Sun Grid Engine, Enterprise Edition 5.3 Software, 1-16 (Nov. 2001).
"IBM and grid: E-business on demand," Retrieved from the Internet: http://www-1.ibm.com/grid/about_grid/ebod.shtml, 1 page.
"IBM and grid: How IBM is using grid," Retrieved from the Internet: http://www-1.ibm.com/grid/about_grid/ibm_grid/grid_today.shtml, 1 page.
"IBM and grid: Open standards," Retrieved from the Internet: http://www-1.ibm.com/grid/about_grid/ibm_grid/open_standards.shtml, 1 page.
"IBM and grid: Overview," Retrieved from the Internet: http://www-1.ibm.com/grid/about_grid/ibm_grid/index.shtml, 1 page.
"IBM and grid: Strategic relationships," Retrieved from the Internet: http://www-1.ibm.com/grid/about_grid/ibm_grid/strategic_relation.shtml, 1 page.
"IBM and grid: Products and services," Retrieved from the Internet: http://www-1.ibm.com/grid/about_grid/ibm_grid/products_services.shtml, 1-2.
"IBM Grid Computing," Retrieved from the Internet: http://www-1.ibm.com/linux/grid/, 1 page.
"Oracle Grid Computing Technologies," Retrieved from the Internet: http://otn.oracle.com/products/oracle9i/grid_computing/index.html, 1-2.
"Sun Cluster Grid Architecture," Sun Microsystems, Inc. 1-42 (2002).
"Sun Powers the Grid," Sun Microsystems, Inc. 1-7 (Feb. 2002).
"Sun's Grid Computing Solutions Outdistance the Competition," Aberdeen Group, Inc. 1-20 (May 2002).
"What is grid computing," Retrieved from the Internet: http://www-1.ibm.com/grid/about_grid/what_is_shtml, 1 page.
Beiriger, Judy et al., "Constructing the ASCI Computational Grid," Sandia National Laboratories, P.O. Box 5800, Albuquerque, NM 87185-1137.
Berman, Fran et al., "Application-Level Scheduling on Distributed Heterogeneous Networks (Technical Paper)," Proceedings of Supercomputing '96, University of California, S.D., La Jolla, CA.
Berstis, Viktors, "Fundamentals of Grid Computing," IBM Corporation, Redbooks Paper, 1-28 (2002).
Czajkowski, et al., "Grid Information Services for Distributed Resource Sharing," Proceedings 10th IEEE International Symposium on High Performance Distributed Computing IEEE Comput. Soc. Los Alamitos, CA, pp. 181-194, Aug. 2001.
Czajkowski, Karl et al., "A Resource Management Architecture for Metacomputing Systems," University of Southern California, Marina del Rey, CA, Mathematics and Computer Science Division, Argonne, IL 60439.
Czajkowski, Karl, et al., "Grid Information Services for Distributed Resource Sharing," The University of Chicago, California State University, Northridge, University of Southern California, Argonne National Laboratory, Argonne, IL.
Dubinsky et al., "A Flexible Rerouting Protocol in ATM Networks," IEEE Infocom '99, Conference on Computer Communications, Proceedings, 18th Annual Joint Conference of the IEEE Computer and Communications Societies, vol. 3, pp. 1488-1496, Mar. 1999.
Feris, Michael et al., "NEOS and CONDOR: Solving Optimization Problems Over the Internet," CRPC-TR98763-S, Mar. 1998, Rice University, Houston, TX.
Ferreira, et al., "Grid computing with the IBM Grid Toolbox," IBM Corporation, Redbooks, Draft, 1-281, Review (Apr. 12, 2004).

Ferreira, et al., "Introduction to Grid Computing with Globus," IBM Corporation, Redbooks, 2nd Edition, 1-268 (2003).
Foster, Ian et al., "A Grid-Enabled MPI: Message Passing in Heterogeneous Distributed Computing System," Argonne National Laboratory, Argonne, IL, Northern Illinois University, DeKalb, IL.
Foster, Ian et al., "A Quality of Service Architecture that Combines Resources Reservation and Application Adaptation," Argonne National Laboratory, Argonne, IL, The University of Chicago, Chicago, IL, Central Institute for Applied Mathematics, Forschungszentrum Juelich GmbH, Juelich, Germany.
Foster, Ian et al., "The Anatomuy of the Grid," Enabling Scalable Virtual Organizations. Argome National Library, Argonne, IL; University of Chicago, Chicago, IL. University of Southern California, Marina del Rey, CA, 2001.
Foster, Ian et al., "The Physiology of the Grid," An Open Grid Services Architecture for Distributed Systems Integration, Argonne National Laboratory, Argonne, IL, University of Chicago, Chicago, IL, University of Southern California, Marina del Rey, CA, IBM Corporation, Poughkeepsie, NY.
Frey, James et al., "Confor-G: A Computation Management Agent for Multi-Institutional Grids," University of Wisconsin, Madison, WI, Argonne National Laboratory, Argonne, IL.
Goteti, Srikanth et al., "Communication Pattern Based Node Selection for Shared Networks," ComStock, Division of Interactive Data Corp., Harrison, NY, University of Houston, Houston, TX.
Goux, Jean Pierre et al., "An Enabling Framework for Master-Worker Applications on the Computational Grid," Mar. 10, 2000.
Goyal, Brajesh, "Oracle and the Grid," An Oracle White Paper, Oracle Corporation, 1-15 (Nov. 2002).
Injey, Franck, "External Time Reference (ETR) Requirements on z990," IBM Corporation Redbooks Flash, 1-20 (2004).
International Search Report for PCT/EP2004/008448.
Litzkow, Michael J. et al., "Condor—A Hunter of Idle Workstations," University of Wisconsin, Madison, WI, 1988, IEEE.
Lowekamp, Bruce et al., "A Resource Query Interface for Network-Aware Applications," Carnegie Mellon University, Pittsburg, PA.
Papakhian, Mary et al., "Comparing Job-Management Systems: The User's Perspective," Technology News and Reviews, IEEE Computational Science & Engineering, Apr.-Jun. 1998.
Sandholm, Thomas et al., "Java OGSI Hosting Environment Design a Portable Grid Service Container Framework," Argonne National Laboratory, IL, IBM Poughkeepsie, NY.
Tuecke, S., "Open Grid Services Infrastructure (OGSI) Version 1.0," ogsi-wg@ggf.org, Jun. 27, 2003.
Al-Ali et al., "QoS adaptation in service-oriented grids," Proceedings of the 1st Int'l Workshop on Middleware for Grid Computing (MGC2003), Rio de Janeiro, Brazil, Jun. 2003, retrieved from the internet on Oct. 19, 2009 via http://citeseerx.ist.psu.edu/viewdoc/summary?doi=10.1.1.105.2673 (11 pages).
European Examination Report, dated Nov. 4, 2009, for corresponding EP Application No. 04 741 290.3-1243 (5 pages).
European Examination Report, dated Nov. 4, 2009, for corresponding EP Application No. 04 763 539.6-1243 (6 pages).
Hoschek, Wolfgang, et al., "Data Management in an International Data Grid Project," Springer-Verlag, Berlin Heidelberg, Germany, pp. 77-90, 2000.
Johner et al., "Understanding LDAP," IBM Redbook, Jun. 1998, retrieved from the internet on Feb. 2, 2008, http://keinzerberus2000.aldebaran.de/LDAPIBMUnderstandingsg244986.pdf. (192 pages).
Official Notice of Rejection mailed on Aug. 11, 2009 of Japanese Patent Application No. 2006-521512, (2 pages) and translation thereof (2 pages).
Official Notice of Rejection mailed on Feb. 19, 2010 of Japanese Patent Application No. 2006-521510, (2 pages) and translation thereof (3 pages).
Official Notice of Rejection mailed on Feb. 9, 2010 of Japanese Patent Application No. 2006-521511, (2 pages) and translation thereof (2 pages).
Official Notice of Rejection mailed on Sep. 11, 2009 of Japanese Patent Application No. 2006-521516, (6 pages) and translation thereof (6 pages).

"How Sun ™ Grid Engine, Enterprise Edition 5.3 Works," Policy Systems in Sun Grid Engine, Enterprise Editiion 5.3 Software, 1-16 (Nov. 2001).

"Sun Powers the Grid," Sun Microsystems, Inc. 1-7 (February 2002).

"eserver xSeries 335 Type 8676 User's Guide," Feb. 2003, IBM Product User's Guide, Chapter 1, pp. 1-12.

About Grid computing [online]. IBM, [retrieved on Apr. 14, 2001]. Retrieved from the Internet: http://www-1.ibm.com/grid/about_grid/index.shtml. 1 page.

Beiriger, Judy et al., "Constructing the ASCI Computational Grid," 2000, p. 193-9, IEEE Comput. Soc., Los Alamitos, CA.

Berman, Fran et al., "Application-Level Scheduling on Distributed Heterogeneous Networks (Technical Paper)," Proceedings of Supercomputing '96, 1996, Article No. 39, pp. 1-28, University of California-San Diego, La Jolla, CA.

Czajkowski, Karl et al, "Grid Information Services for Distributed Resource Sharing," 2001, pp. 181-94, IEEE Comput. Soc., Los Alamitos, CA.

Czajkowski, Karl et al., "A Resource Management Architecture for Metacomputing Systems," 1998, vol. 1459, pp. 62-82, University of Southern California, Marina del Rey, CA; Mathematics and Computer Science Division, Argonne, IL.

FAQ [online]. IBM, [retrieved on Apr. 14, 2004]. Retrieved from the Internet: http://vvww-1.ibm.com/grid/about grid/faq.shtml. 4 pages.

Ferris, Michael et al., "NEOS and CONDOR: Solving Optimization Problems Over the Internet," CRPC-TR98763-S, Mar. 1998, pp. 1-18, Rice University, Houston, TX.

Foster, Ian et al., "A Grid-Enabled MPI: Message Passing in Heterogeneous Distributed Computer System," 1998, p. 15, IEEE Comput. Soc., Los Alamitos, CA.

Foster, Ian et al., "A Quality of Service Architecture that Combines Resource Reservation and Application Adaptation," 2000, pp. 181-8, IEEE, Piscataway, NJ.

Foster, Ian et al., "The Anatomy of the Grid: Enabling Scalable Virtual Organizations," 2001, pp. 1-25, Argonne National Laboratory, Argonne, IL; University of Chicago, Chicago, IL; University of Southern California, Marina del Rey, CA.

Foster, Ian et al., "The Physiology of the Grid," 2002, An Open Grid Services Architecture for Distributed Systems Integration, pp. 1-31, Argonne National Laboratory, Argonne, IL; University of Chicago, Chicago, IL; University of Southern California, Marina del Rey, CA; IBM Corporation, Poughkeepsie, NY.

Frey, James et al., "Condo-G: a Computation Management Agent for Multi-Institutional Grids," 2002, vol. 5, No. 3, pp. 237-46, Kluwer Academic Publishers, Netherlands.

Goteti, Srikanth et al., "Communication Pattern Based Node Selection for Shared Networks," 2003, pp. 69-76, IEEE Comput. Soc., Los Alamitos, CA.

Goux, Jean Pierre et al., "An Enabling Framework for Master-Worker Applications on the Computational Grid," 2000, pp. 43-50, IEEE Computer Soc., Los Alamitos, CA.

Grid Benefits [online]. IBM, [retrieved on Apr. 14, 2004]. Retrieved from the Internet: http://www-1.ibm.com/grid/about grid/benefits.shtml. pp. 1-2.

IBM and grid: E-business on demand [online]. IBM, [retrieved on Apr. 14, 2004]. Retrieved from the Internet: http://vvww-1.ibm.com/grid/about grid/ibm grid/ebod.shtml. 1 page.

IBM and grid: How IBM is using grid [online]. IBM, [retrieved on Apr. 14, 2004]. Retrieved from the Internet: http://wwvv-1.ibm.com/grid/about grid/ibm grid/grid today.shtml. 1 page.

IBM and grid: Open standards [online]. IBM, [retrieved on Apr. 14, 2004]. Retrieved from the Internet: http://vvww-1.ibm.com/grid/about grid/ibm grid/open standards.shtml. 1 page.

IBM and grid: Overview [online]. IBM, [retrieved on Apr. 14, 2004]. Retrieved from the Internet: http://www-1.ibm.com/grid/about grid/ibm grid/index.shtml. 1 page.

IBM and grid: Products and services [online]. IBM, [retrieved on Apr. 14, 2004]. Retrieved from the Internet: http://www-1.ibm.com/grid/about grid/ibm grid/products services.shtml. 2 pages.

IBM and grid: Strategic relationships [online]. IBM, [retrieved on Apr. 14, 2004]. Retrieved from the Internet: http://www-1.ibm.com/grid/about grid/ibm grid/strategic relation.shtml. 1 page.

IBM Grid computing [online]. IBM, [retrieved on Apr. 14, 2004]. Retrieved from the Internet: http://www-1.ibm.com/linux/grid/. 1 page.

International Search Report for PCT/EP2004/008448, dated Jan. 19, 2005, 7 pgs.

Konya, B., "The NorduGrid Information System," Retrieved from the Internet: http://www.nordugrid.org, Sep. 16, 2002.

Litzkow, Michael J. et al., "Condor—A Hunter of Idle Workstations," 1988, pp. 104-111, 8th International Conference on Distributed Computing Systems, San Jose, CA.

Lowekamp, Bruce et al., "A Resource Query Interface for Network-Aware Applications," 1999, vol. 2, No. 2, pp. 139-51, Baltzer, Netherlands.

Open Grid Services Infrastructure (OGSI), "Open Grid Services Infrastructure (OGSI) Version 1.0, " Global Grid Forum, Jun. 27, 2003 (86 pages).

Oracle Grid Computing Technologies [online]. Oracle, [retrieved on Apr. 15, 2004]. Retrieved from the Internet: http://otn.oracle.com/products/oracle9i/gridcomputing/index.html. 2 pages.

Papakhian, Mary et al., "Comparing Job-Management Systems: The User's Perspective," Apr.-Jun. 1998, vol. 5, No. 2, pp. 4-9, Technology News and Reviews, IEEE Computational Science & Engineering.

Sandholm, Thomas et al., "Java OGSI Hosting Environment Design a Portable Grid Service Container Framework," 2002, pp. 1-20, Argonne National Laboratory, IBM Poughkeepsie, NY.

What is grid computing [online]. IBM, [retrieved on Apr. 14, 2004]. Retrieved from the Internet: http://www-1.ibm.com/grid/about grid/what is.shtml. 1 page.

\* cited by examiner

METHOD AND SYSTEM FOR MAINTAINING A GRID COMPUTING ENVIRONMENT HAVING HIERARCHICAL RELATIONS

CROSS-REFERENCE TO RELATED APPLICATIONS

This is a division of application Ser. No. 10/712,155, filed Nov. 12, 2003 now U.S. Pat. No. 7,594,015, and claims the benefit of U.S. Provisional Application No. 60/490,818, filed Jul. 28, 2003, which are incorporated herein by reference.

TECHNICAL FIELD

The present invention relates to data processing by digital computer, and more particularly to a dynamic tree structure for grid computing.

BACKGROUND

In today's data centers, the clusters of servers in a client-server network that run business applications often do a poor job of managing unpredictable workloads. One server may sit idle, while another is constrained. This leads to a "Catch-22" where companies, needing to avoid network bottlenecks and safeguard connectivity with customers, business partners and employees, often plan for the highest spikes in workload demand, then watch as those surplus servers operate well under capacity most of the time.

In grid computing, all of the disparate computers and systems in an organization or among organizations become one large, integrated computing system. That single integrated system can then handle problems and processes too large and intensive for any single computer to easily handle in an efficient manner.

More specifically, grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of virtual organizations for applications and data sharing.

SUMMARY

In one aspect, the invention features a method that includes, in a client server network, maintaining systems having grid managers having hierarchical relations, the relations of each grid manager stored in each of the systems.

Embodiments may include the following. Each of the hierarchical relations are classified as superior or inferior.

In another aspect, the invention features a system that includes a network of computer systems, each of the computer systems including a grid management engine, each of the grid managers having hierarchical relations with other grid managers, the relations of each grid manager stored in each of the systems.

Embodiments may include the following. Each of the relations are classified as superior or inferior.

In another aspect, the invention features a method that includes, in a network, starting an execution of a first service on a first computer, the first service handling at least locating, reserving, allocating, monitoring, and deallocating one or more computational resources for one or more applications using the network. The method further includes reading, by the first service, a file to inform the first service of a relation with a second service, wherein the first service has a inferior relation with the second service, the inferior relation meaning that the second service can send a query for available computer resources to the first service. The method further includes establishing a first communication channel from the first service to the second service, and accepting an opening of a second communication channel from the second service to the first service.

Embodiments may include one or more of the following. The method includes receiving a message to cancel the first service's inferior relation with the second service, closing the first and second communication channels, receiving a message to generate a inferior relation from the first service to a third service residing in a third computer, establishing a third communication channel from the second service to the third service, and accepting an opening of a fourth communication channel from the third service to the first service. In some cases, establishing a first communication channel further includes determining if the second service responds to determining and if not, establishing a communication channel to the second service after a predetermined time period.

In another aspect, the invention features a method that includes, in a network, starting an execution of a first service residing in a first computer, the first service handling at least locating, allocating, monitoring, and deallocating one or more computational resources for one or more applications using the network, starting an execution of a second service residing in a second computer, and reading, by the second service, a file to inform the second service of a relation with the first service, wherein the second service has a inferior relation with the first service, wherein the inferior relation indicates that the first service can send a query for available computer resources to the second service. The method further includes establishing a first communication channel from the second service to the first service, and establishing a second communication channel from the first service to the second service.

Embodiments may include the following. The method of further includes receiving, by the second service, a message to cancel the second service's relation with the first service, closing the first communication channel, failing to respond to the second communication channel, receiving a message to create a inferior relation from the second service to a third service, establishing a third communication channel from the second service to the third service, and establishing a fourth communication channel from the second service to the third service.

In another aspect, the invention features a system that includes two or more computers each configured to run a service, the service handling at least locating, allocating, monitoring, and deallocating one or more computational resources for one or more applications. The system also includes a network of the services, the network configured such that a first service from the services has a superior relation with a second service from the services and the second service has an inferior relation with the first service, wherein the first service is configured to check the status of the second service in the network by waiting for a response to a query from the first service to the second service.

Embodiments may include the following. The relation includes a first communication channel from the first service to the second service and a second communication channel from the second service to the first service. The first service is further configured to locate the one or more computational resources for the one or more applications by sending a query for available computational resources to the second service. The second service is further configured to remove its inferior relation with the first service and create a new superior relation with a third service.

These and other embodiments may have the following advantage. A fast and robust grid computing environment can be achieved using the dynamic tree structure for grid management.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A is a flow diagram for starting up an application in the computer device of FIG. 4.

Like reference symbols in the various drawings indicate like elements.

DETAILED DESCRIPTION

Figure 1:
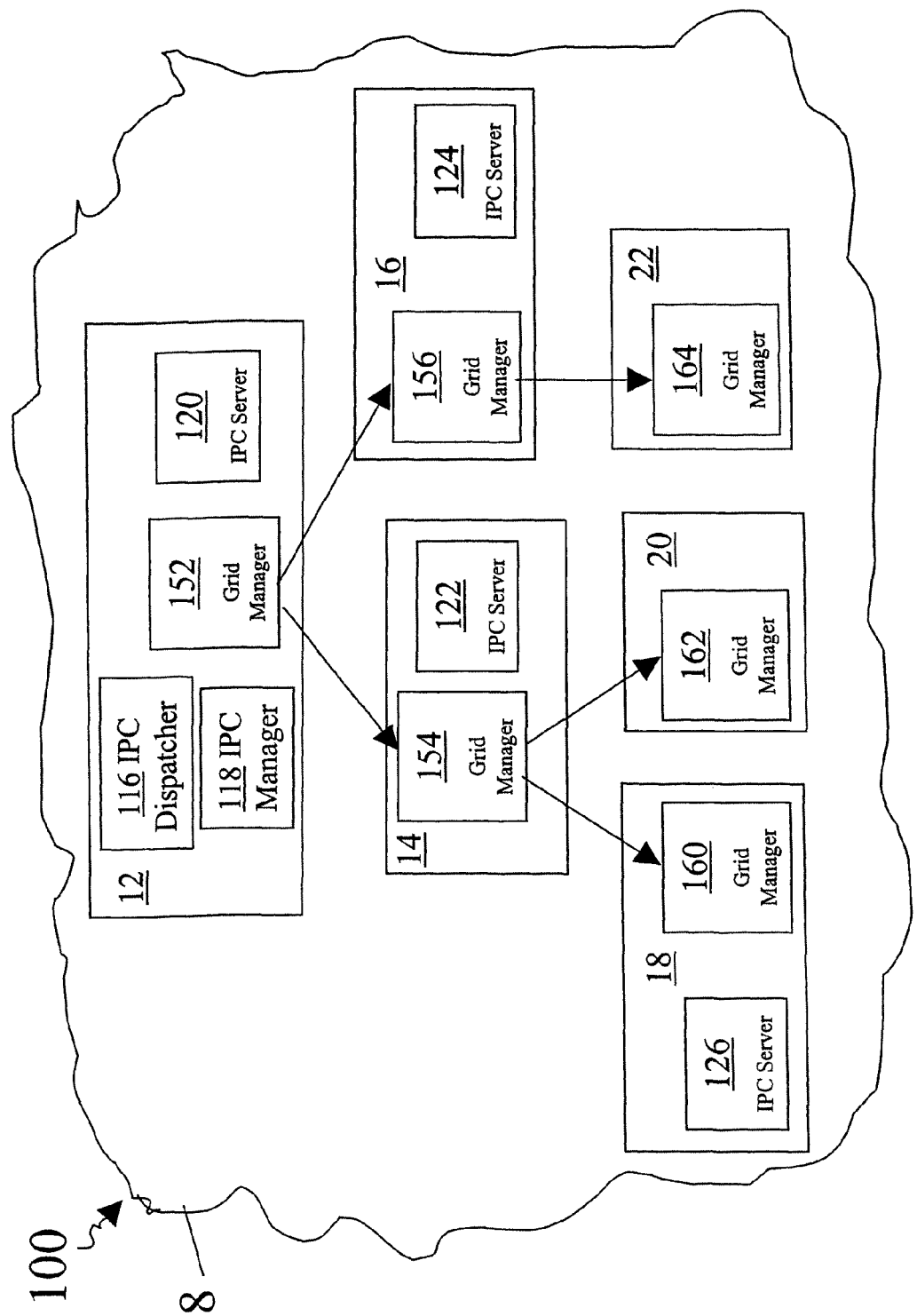
FIG. 1 is a block diagram of a grid computing environment.

As shown in FIG. 1, services in a grid computing environment 100 manage computational resources for applications. The grid computing environment 100 is a set of distributed computing resources that can individually be assigned to perform computing or data retrieval tasks for the applications. The computational resources include computer devices 12, 14, 16, 18, 20, and 22. The computer devices communicate using a network 8. The applications have scalable computational requirements. For example, an example application that uses computer devices 12, 14, 16, 18, 20, and 22 in the grid computing environment 100 is an internet pricing configurator. The computer device 12 provides network access to pricing information to users via web browsers on computer devices that are connected to the internet. The web browsers can be any application able to display content and/or execute applications such as web pages, media files, and programs, such as Netscape Navigator®, Microsoft Internet Explorer®, and similar applications.

In this example, a web server on computer device 12 provides pricing information to the users. Calculation parameters for each price to be calculated are passed by an IPC dispatcher 116 to IPC servers 120, 122, 124, and 126 that execute on computer devices 12, 14, 16, and 18, respectively. Due to the flexibility of the web server and applications on the internet, the number of users can vary. This generates dynamic computational requirements for the internet pricing configurator. An IPC manager 118 communicates with services in the grid computing environment 100 so that the services can allocate and deallocate computational resources (e.g., processors in computer devices 12, 14, 16, 18, 20, 22) based on the dynamic computational requirements of the internet pricing configurator. Allocating and deallocating computational resources in this manner allows computer devices 12, 14, 16, 18, 20, or 22 to be designated as general-purpose computational resources and not solely dedicated to handling peak demands of the internet pricing configurator application. The IPC manager 118 coordinates with the IPC dispatcher 116 so that the IPC dispatcher 116 has access to resources in network 8.

This capability to allocate and deallocate the resources in the grid computing environment 100 enables the IPC manager 118 to locate and use available computational resources on an "as needed" basis. Once resources are located, the IPC manager 118 can use services in the grid computing environment 100 to install the IPC servers 120, 122, 124, and 126 as applications on computer devices in the grid computing environment 100. The IPC dispatcher 116 uses Web Service Definition Language (WSDL) interfaces defined in the Open Grid Services Infrastructure (OGSI) Version 1.0 by Tuecke et al to manage and exchange the information flow between the IPC dispatcher 116 and IPC servers 120, 122, 124, and 126. For example, the OGSI WSDL interfaces can be used to pass computation parameters for pricing calculations from the IPC dispatcher 116 and the IPC servers 120, 122, 124, and 126. The OGSI WSDL interfaces can also be used to pass completed results from the IPC servers 120, 122, 124, and 126 back to IPC dispatcher 116. The OGSI Version 1.0 is incorporated herein by reference. The OGSI WSDL interfaces enable the controlled, fault-resilient, and secure management of the grid computing environment 100 and applications such as the internet pricing configurator.

While the IPC dispatcher 116 uses IPC servers 120, 122, 124, and 126 to perform calculations for users, services in the grid computing environment 100 monitor resource utilization on computer devices in the grid computing environment 100 running the IPC servers 120, 122, 124, and 126. The services also send this utilization information to the IPC manager 118. Based on a comparison between utilization requirements and current resource loading, the IPC manager 118 can dynamically inform services in the grid computing environment 100 to allocate more resources for IPC servers 120, 122, 124, and 126 or deallocate resources to keep utilization of resources in the grid computing environment 100 at a desired level.

Grid managers 152, 154, 156, 160, 162, and 164 are resident in computer devices 12, 14, 16, 18, 20, and 22, respectively. Within the grid computing environment 100, pairs of grid managers can have directional relations that classify one grid manager as superior to another grid manager. A grid manager can have more than one superior relations with other grid managers. For example, grid manager 152 has a superior relation with grid managers 154 and 156. A grid manager can also have more than one inferior relations with other grid managers. Through these hierarchical relations, IPC manager 118 does not need access to a list of all computer devices in network 8 to use the computational resources in the grid computing environment 100. IPC manager 118 is only required to have access to a network address of one computer device running a grid manager (e.g., computer device 12 running grid manager 152) and this grid manager uses its relations with other grid managers running on other computer devices to provide IPC dispatcher 116 with indirect access to other computer devices in the grid computing environment 100.

A grid manager (e.g., 152, 154, 156, 160, 162, and 164) maintains a first list of all superior relations with other grid managers and a second list of all inferior relations with other grid managers. Each grid manager maintains an "always open" communications channel to all the grid managers in these lists over network 8 using, for example, the aforementioned OGSI WSDL interfaces on transmission control protocol (TCP), hypertext transfer protocol (HTTP), and simple object access protocol (SOAP). These lists and corresponding communication channels can be modified, allowing a dynamic reconfiguration of the grid hierarchy during runtime. This also allows a failing grid manager to be dynamically replaced in the hierarchy. For example, referring to FIG. 1, if grid manager 154 fails, then grid manager 152 loses its connection to grid managers 160 and 162. In this case, relations between grid managers can be modified so that grid manager 152 has new superior relations to grid managers 160 and 162. Likewise, grid managers 160 and 162 have new inferior relations to grid manager 152.

Figure 2:
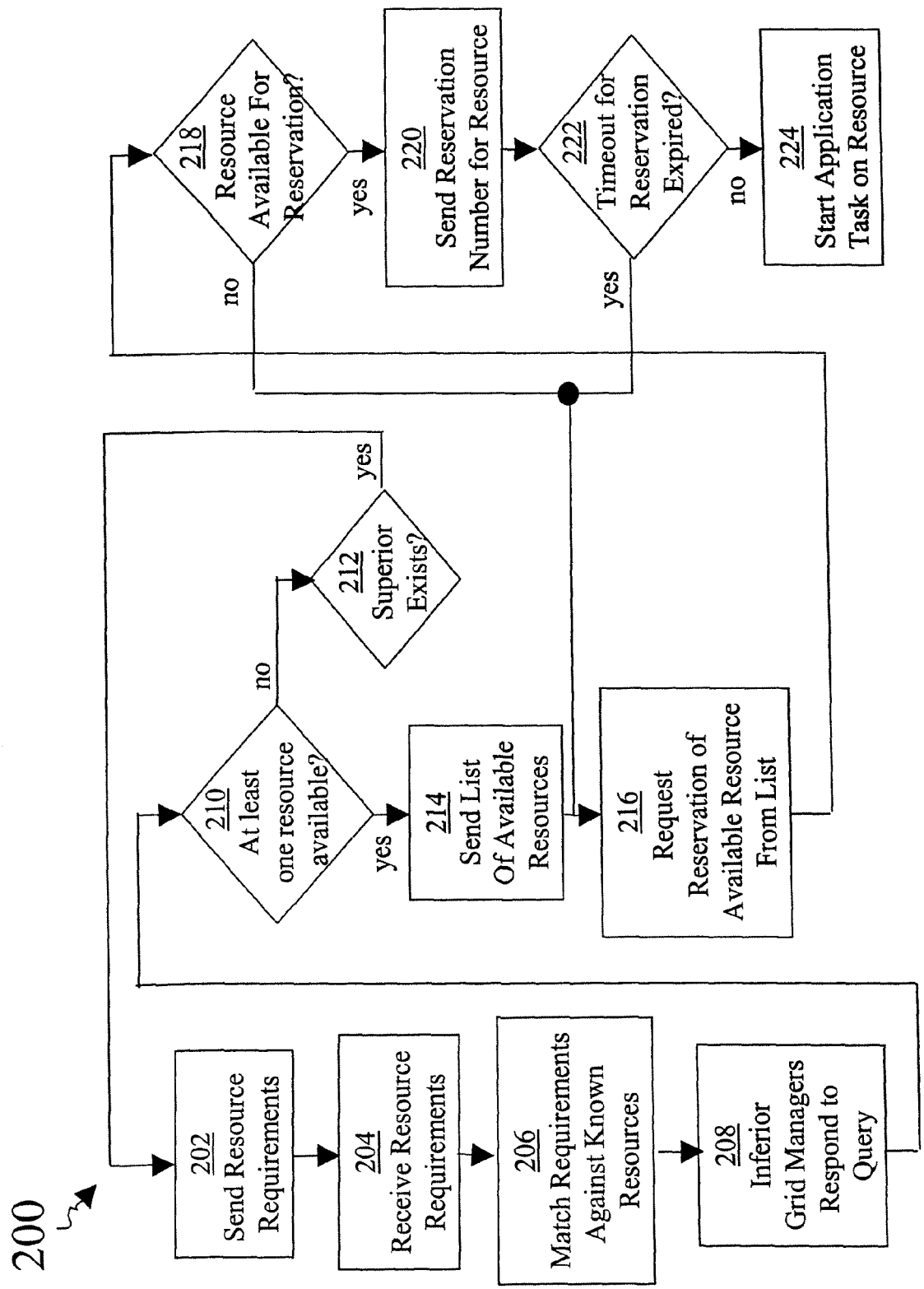
FIG. 2 is a flow diagram for discovering and reserving resources in the grid computing environment of FIG. 1.

As shown in FIG. 2, an application start process 200 is designed so applications (e.g., internet pricing configurator) get necessary resources allocated in the network 8 before executing on a computer device (e.g., 12, 14, 16, 18, 20, or 22). Process 200 also guarantees if similar applications are trying to start at the same time on the same resource on a computer device that the two or more applications do not collide or interfere with each other. For example, the IPC manager 118 can require that an IPC server (e.g., 120) be the only application executing on a processor in computer device 14 for quality of service (QoS). In this case, another application would interfere if the other application simultaneously attempted to execute on the processor in computer device 14.

Process 200 includes IPC manager 118 (or some other application) sending (202) requirements for computational resources to query a grid manager (e.g., 154) to determine if there are resources matching these requirements available in the grid computing environment 100. These requirements specify information pertaining to resources in a computer device such as required number of processors, required percentage of utilization for those processors, main memory, and network speed. The query can also include information to which hierarchy level (in the grid computing environment 100) the query should be propagated. Process 200 includes grid manager 154 receiving (204) the requirements.

To respond to the query for available resources from IPC manager 118, process 200 includes grid manager 154 matching (206) the requirements against resources known to grid manager 154. These resources include resources (e.g., processor 40) in computer device 14 that are directly managed by grid manager 154. Resources directly managed by grid manager 154 that are currently available and meet the requirements are added to a resource-query list maintained by grid manager 154.

Grid manager 154 also sends the query to grid managers 160 and 162 having inferior relations with grid manager 154. Process 200 includes grid managers 160 and 162 responding (208) to the query by sending to grid manager 154 lists of resources (e.g., processors on computer devices 18, 20) that meet the requested requirements and are available and known to grid managers 160 and 162, respectively. These resource-query lists of resources that are known to grid managers 160 and 162 can also include resources managed by grid managers (not shown) with inferior relations to grid managers 160 and 162. Grid manager 154 adds these resource-query lists of available resources from grid managers 160 and 162 to its resource-query list of available resources meeting the requested requirements. If process 200 determines (210) that there is at least one resource (e.g., processor 40) in this resource-query list, then grid manager 154 sends (214) this resource-query list to IPC manager 118. Otherwise, if process 200 determines (212) that grid manager 154 has a relation with a superior grid manager (e.g., grid manager 152), grid manager 154 sends (202) the query for available resources to grid manager 152. In response to this query, grid manager 152 does not send a redundant query back to grid manager 154 having an inferior relation with grid manager 152.

Process 200 includes grid manager 154 sending (214) the list of available resources along with addresses of their corresponding grid managers in the network 8 that match the requirements. The IPC manager 118 selects a resource (e.g., on computer device 16) from the list and requests (216) a reservation of the resource on computer device 16 to the grid manager 154 managing the resource on computer device 16. If the resource in computer device 16 is still available for reservation (218) and the reservation succeeds, grid manager 154 sends (220) a reservation number to the IPC manager 118. This reservation means that the IPC manager 118 is guaranteed and allocated the requested resource on the computer device 16 in the grid computing environment 100. The grid manager 154 handles queries for available resources from applications such as IPC manager 118 using independent processing threads of execution. Thus, the grid manager 154 uses a semaphore to ensure that the same resource (e.g., processor 40) is not assigned multiple reservation numbers for different applications simultaneously requesting the same resource.

If the grid manager determines that the requested resource in computer device 16 is not available for reservation and the reservation fails, the IPC manager 118 selects the next available resource in the list and requests (216) the reservation of this next available resource. If the IPC manager 118 receives a registration number and a timeout measured from the sending of the registration number does not expire (222), the IPC manager 118 starts (224) the IPC server 122 on the processor 40 resource in computer device 16. Starting the IPC server 122 is initiated by passing the reservation number and an application file to the grid manager 156 and then grid manager 156 reads the application file to install and execute the IPC server 122 on computer device 16.

Figure 3:
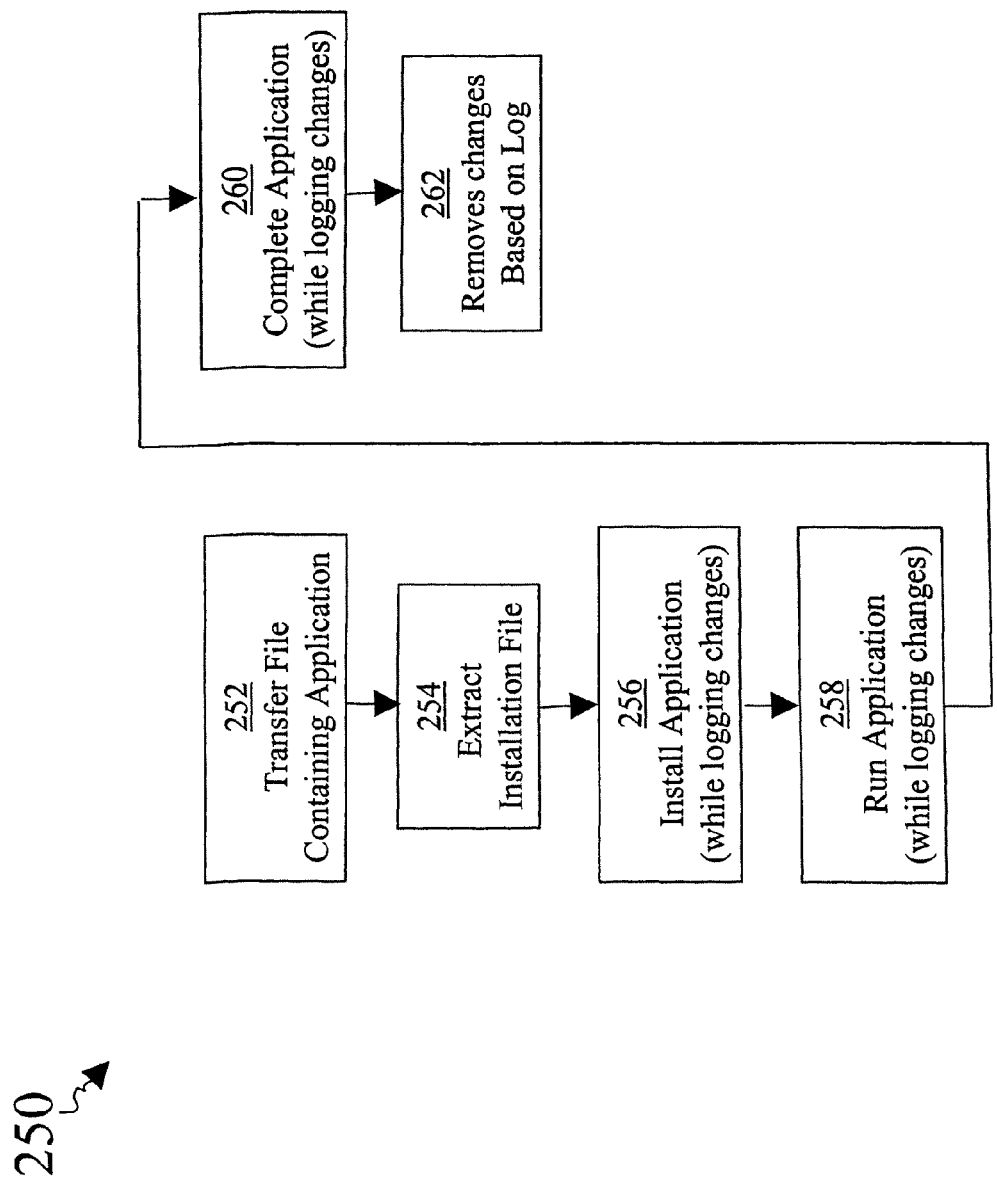
FIG. 3 is a flow diagram for installing, running, and removing applications in the grid computing environment of FIG. 1.

As shown in FIG. 3, process 250 installs an application (e.g., IPC server 122) on a computer device (e.g., 14) in the grid computing environment 100 to set up an available resource for the application, using the available resource, and removing or deinstalling the application to free up the resource for use by subsequent applications when the resource is no longer needed. Process 250 includes IPC manager 118 transferring (252) an application file containing code for IPC server 122 in addition to instructions on how to install, customize, track and remove the application from computer device 14 so that the grid manager 154 can return computer device 14 to an original state after executing the application.

IPC manager 118 transfers the application file using a file transfer protocol (FTP), hypertext transfer protocol (HTTP), or a file copy from a network attached storage (NAS) for example, to computer device 14 as a single file, such as a compressed zip file. Within this zip file there is information about installing and customizing the application IPC server 122. This information is represented by a small executable program or extended markup language (XML) document that is extracted and interpreted (254) by an installation and customizing engine (not shown) in grid manager 154. Process 250 includes grid manager 154 installing (256) and running (258) the application. During installation (256), customization and execution (258) of the application, all changes to the computer device 14 are logged so that when the application is terminated (260) or deinstalled by grid manager 154 upon request by IPC manager 118, grid manager 154 removes the application from the computer device 14 and also removes (262) any other changes to computer device 14 that were done when installing and running the application. Thus, the computer device 14 reverts to its original state prior to execution of the application and all of the resources of computer device 14 are again available for use by a subsequent application. This allows the resources to become available after running the application without rebooting computer device 14. These changes include space in memory (e.g., 32) allocated to store and run application code in addition to other changes such as allocation of communication ports.

In some examples, multiple applications can simultaneously run on resources in a single computer device (e.g., 14). Applications for the grid computing environment 100 are classified in part based on their resource requirements. Some changes to a computer device to run an application are only required for the first execution of an application of its class and subsequent executions do not require these changes. In these examples, grid manager 154 only does the changes for the first execution. Furthermore, when deinstalling the applications, grid manager 154 only removes the changes for the last application that was executed and terminated.

After installing applications on computer devices in the grid computing environment 100, grid managers are configured to start or stop the processes of these applications upon request. In the example of the internet pricing configurator (IPC) application, grid manager 154 is configured to start or stop IPC server 122 on computer device 14 after installing IPC server 122 on computer device 14. The IPC manager 118 requests grid managers to start or stop IPC servers in the grid computing environment 100 based on current utilization of resources in the grid computing environment 100. After stopping IPC server 122 on computer device 14, IPC manager 118 waits a prespecified amount of time and then requests grid manager 154 to deinstall IPC server 122 if current resource utilization does not indicate a need to start IPC server 122 again. Furthermore, as mentioned previously, grid managers monitor resource utilization on computer devices such as computer device 14 running applications (e.g. IPC servers 120, 122, 124, and 126) and send this utilization information to IPC manager 118.

In many examples, control of application processes on resources in a computer device is specific to the operating system (OS). The grid computing environment 100 is configured to handle different operating systems on computer devices. Furthermore, grid computing environment 100 is designed to handle different applications (e.g., internet pricing configurator) that do not have to be redesigned to execute on the grid computing environment 100. A grid manager controls an application process in a general manner that decreases interdependence between development of grid manager code and application code. An interface is provided to application code to enable grid managers to discover, control (e.g., start, stop, halt, resume) and inspect or monitor a state of application processes. The interface is provided for operating system processes that are exposed by the operating system or hosting environment and includes three aspects. One aspect of the interface is process data, such as process identification, states, degree of resource consumption (such as Central Processing Unit (CPU), memory, socket bindings, or other resources that an application can use), and application specific data defined by a process data scheme.

A second aspect of the interface is managing operations, such as start, stop, wait, resume, change priority, and other operations defined by supported managing operations.

A third aspect of the interface is control bindings and definitions, such as process data scheme, supported managing operations, and communication bindings. Since not all applications running in the grid computing environment 100 have access to the same information and capabilities in these three aspects, the applications provide to grid managers a list of queries and commands that each application supports.

The interface provided to application code is an Application Program Interface (API). The API is a set of methods (embedded in software code) prescribed by the grid manager software by which a programmer writing an application program (e.g., internet pricing configurator) can handle requests from the grid manager.

Figure 4:
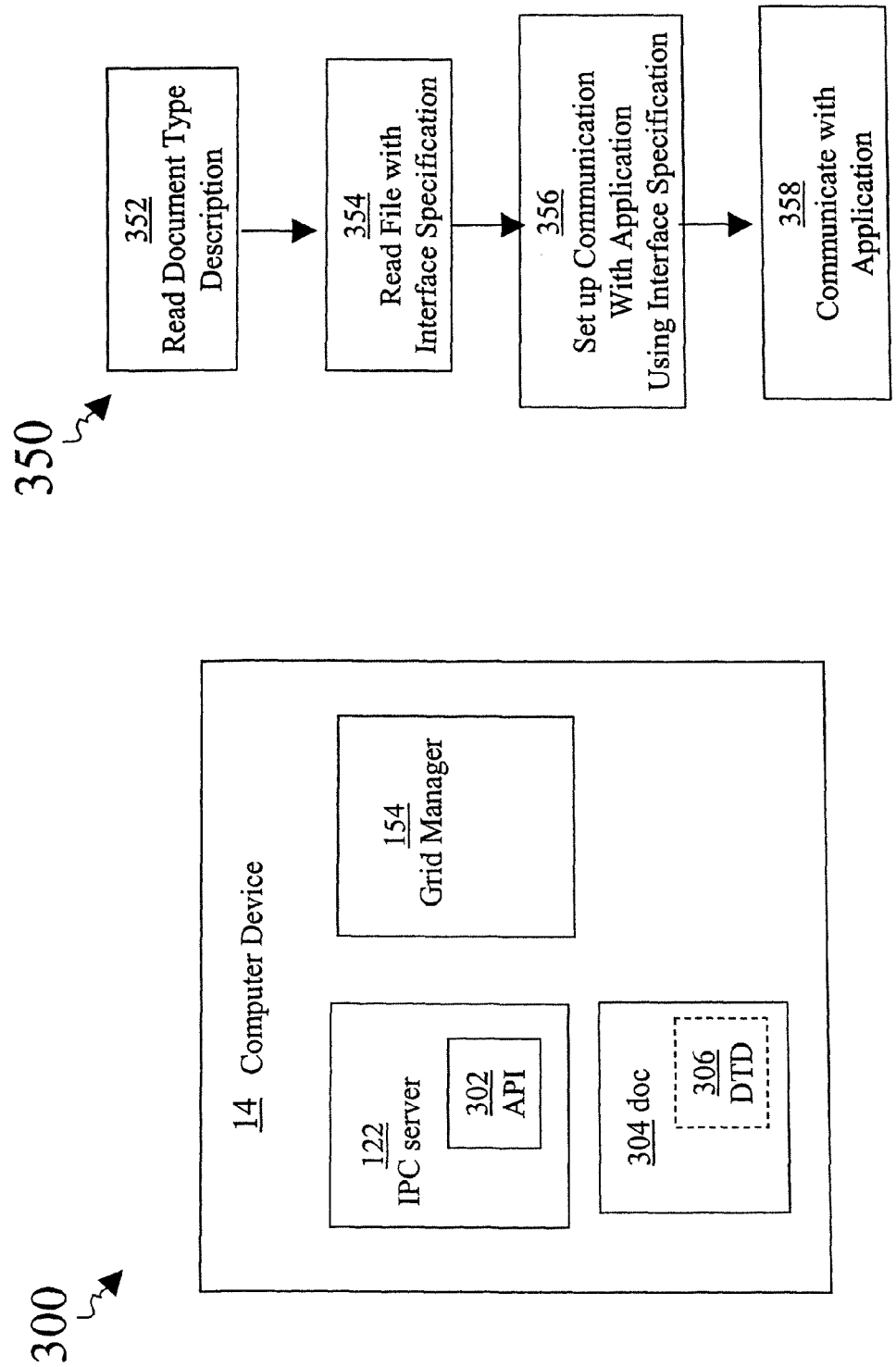
FIG. 4 is a block diagram of a computer device in the grid computing environment of FIG. 1.

As shown in FIG. 4, IPC server 122 includes an API 302 and a document 304. Since the API 302 is adapted to different types of applications, the document 304 describes how grid manager 154 communicates with the IPC server 122 and what requests through the API 302 are supported by the IPC server 122. Grid manager 154 reads document 304 before starting up IPC server 122. In some examples, document 304 is written in XML and includes a Document Type Description (DTD) 306. A DTD is a specific definition that follows the rules of the Standard Generalized Markup Language (SGML). A DTD is a specification that accompanies a document and identifies what the markups are that separate paragraphs, identify topic headings, and how each markup is to be processed. By including the DTD 306 with document 304, grid manager 154 having a DTD "reader" (or "SGML compiler") is able to process the document 304 and can correctly interpret many different kinds of documents 304 that use a range of different markup codes and related meanings.

As shown in FIG. 4A, grid manager 154 uses process 350 to install applications such as IPC server 122. Grid manager 154 reads (352) DTD 306 in document 304 to identify markups in document 304. Grid manager 154 reads (354) document 304 using markups to identify communication parameters for communicating with IPC server 122. Grid manager 154 sets up (356) communications with IPC server 122 based on the specifications of the communication parameters. Grid manager 154 communicates (358) with IPC server 122 using the communication parameters to send requests such as "Start", "Stop", and "Are you idle?".

Figure 5:
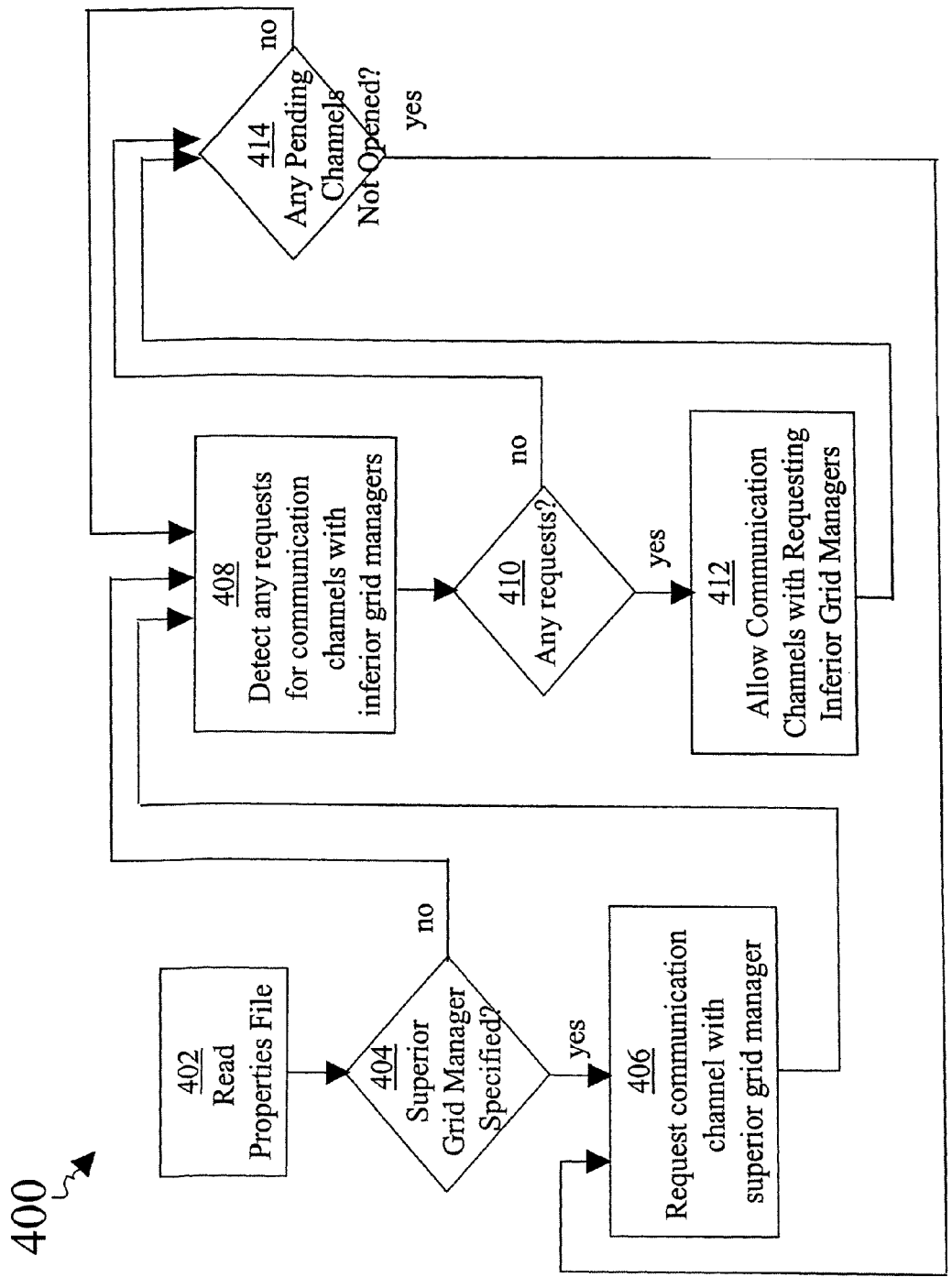
FIG. 5 is a flow diagram for starting up grid managers in the grid computing environment of FIG. 1.
Figure 5A:
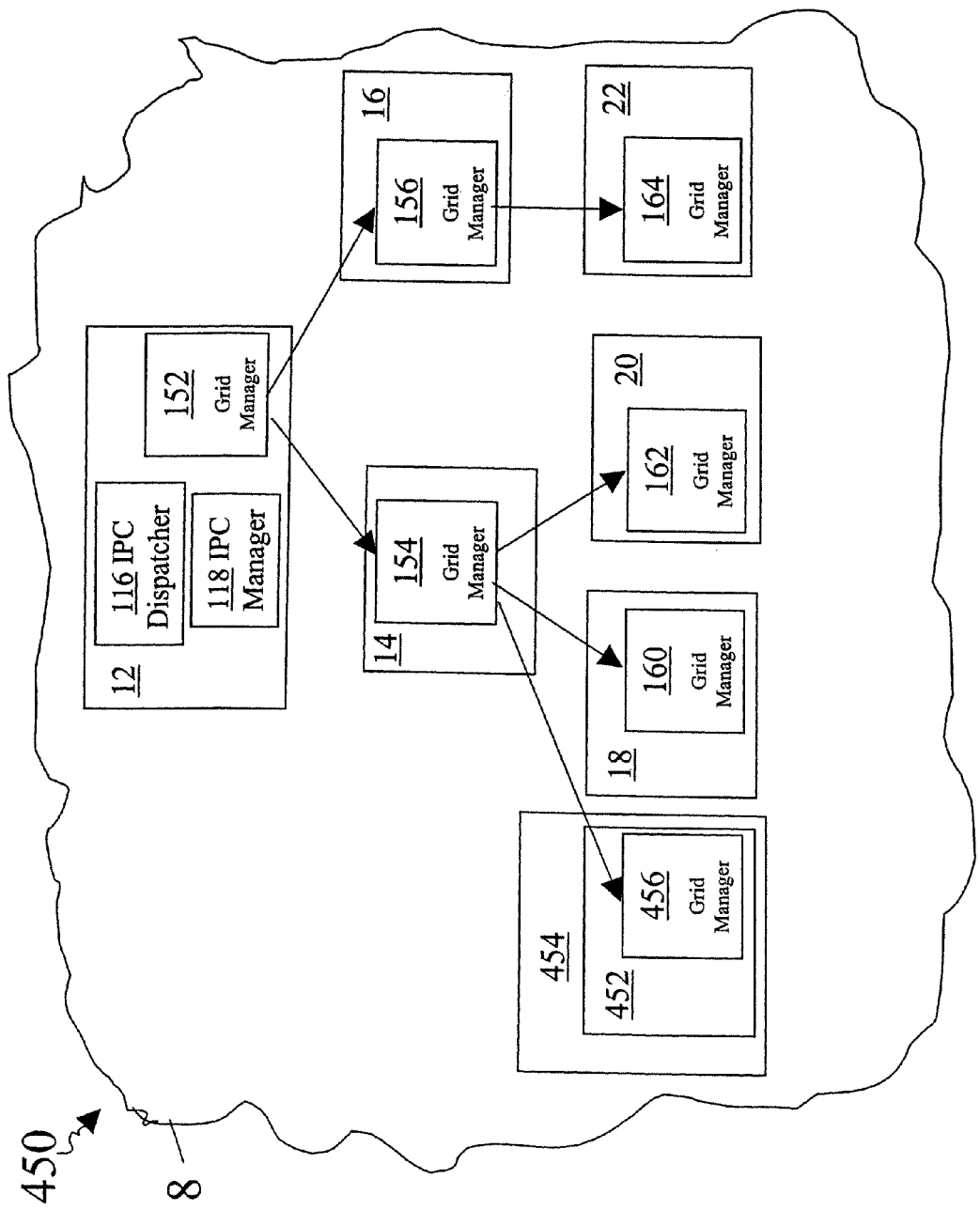
FIG. 5A is a block diagram of the grid computing environment of FIG. 1 that is augmented with another computer device.

Before any applications (e.g., internet pricing configurator) can be executed on network 8, grid managers 152, 154, 156, 160, 162, and 164 are asynchronously started up on computer devices 12, 14, 16, 18, 20, and 22, and relations to other grid managers are established. As shown in FIG. 5, process 400 initializes relations among grid managers. For each grid manager (e.g., grid manager 154), the grid manager 154 starts up on computer device 14 by reading (402) a properties file. The properties file contains a list of addresses of computer devices with grid managers having superior relations to grid manager 154. This list was described earlier as a first list of all superior relations with other grid managers. If (404) a superior grid manager (e.g., grid manager 152) is specified in this list of addresses, grid manager 154 requests (406) to open a communication channel to the superior grid manager (e.g., 152). If grid manager 152 is already started, then grid manager 152 responds by accepting the request of the opening of the communication channel from grid manager 152. Process 400 includes grid manager 154 detecting (408) any requests for communication channels from grid managers (e.g., grid managers 160, 162) identified as having inferior relations with grid manager 154. If process 400 determines (410) that there are some requests, grid manager 154 allows communication channels from the inferior grid managers (e.g., 160, 162). Process 400 includes grid manager 154 checking (414) if there are any pending requests for communication to grid managers having superior relations. If there are any pending requests, grid manager 154 requests (406) communication channels to grid managers. These communication channels are used for resource queries between grid managers (as described previously) and "heart beat" messages between grid managers to ensure that each grid manager in the grid computing environment 100 is functioning.

Once grid managers 152, 154, 156, 160, 162, and 164 are running with established relations, the grid managers are used for the proper operation of the grid computing environment 100. Often during the lifecycle of the grid computing environment 100 the functionality of the grid managers are enhanced. It is often not possible or convenient to shut down the grid computing environment 100 and start the grid computing environment 100 up with the enhancements. Grid managers 152, 154, 156, 160, 162, and 164 are configured so that there is only a minimal impact on users of the grid computing environment 100 when a change happens. To enable this transparency, an API is provided for user interfaces to enable an administrator of grid computing environment 100 to access each of the grid managers 152, 154, 156, 160, 162, and 164 individually or all together. The API is static in that it includes only one method, i.e., a string that contains a command typed by the administrator. The API is dynamic because the string can contain many different commands.

In some cases, the grid managers are developed using the Java programming language. In these cases, new commands issued to the grid managers can be supported by loading new or revised Java classes dynamically via classloaders. This dynamic access to code can be done without shutting down grid managers in the grid computing environment 100. Using Java classloaders, each time an instance of a class for a grid manager is generated, the definition and behavior of the class can be updated to provide new functionality to the grid computing environment 100.

Another way to modify the functionality of the grid computing environment 100 dynamically without shutting down the grid computing environment 100 is to change the hierarchical relations between grid managers, remove grid managers, or add new grid managers. The API provided for administration of the grid computing environment 100 is also configured to send strings to individual grid managers with commands to delete existing relations or add new relations.

Figure 6:
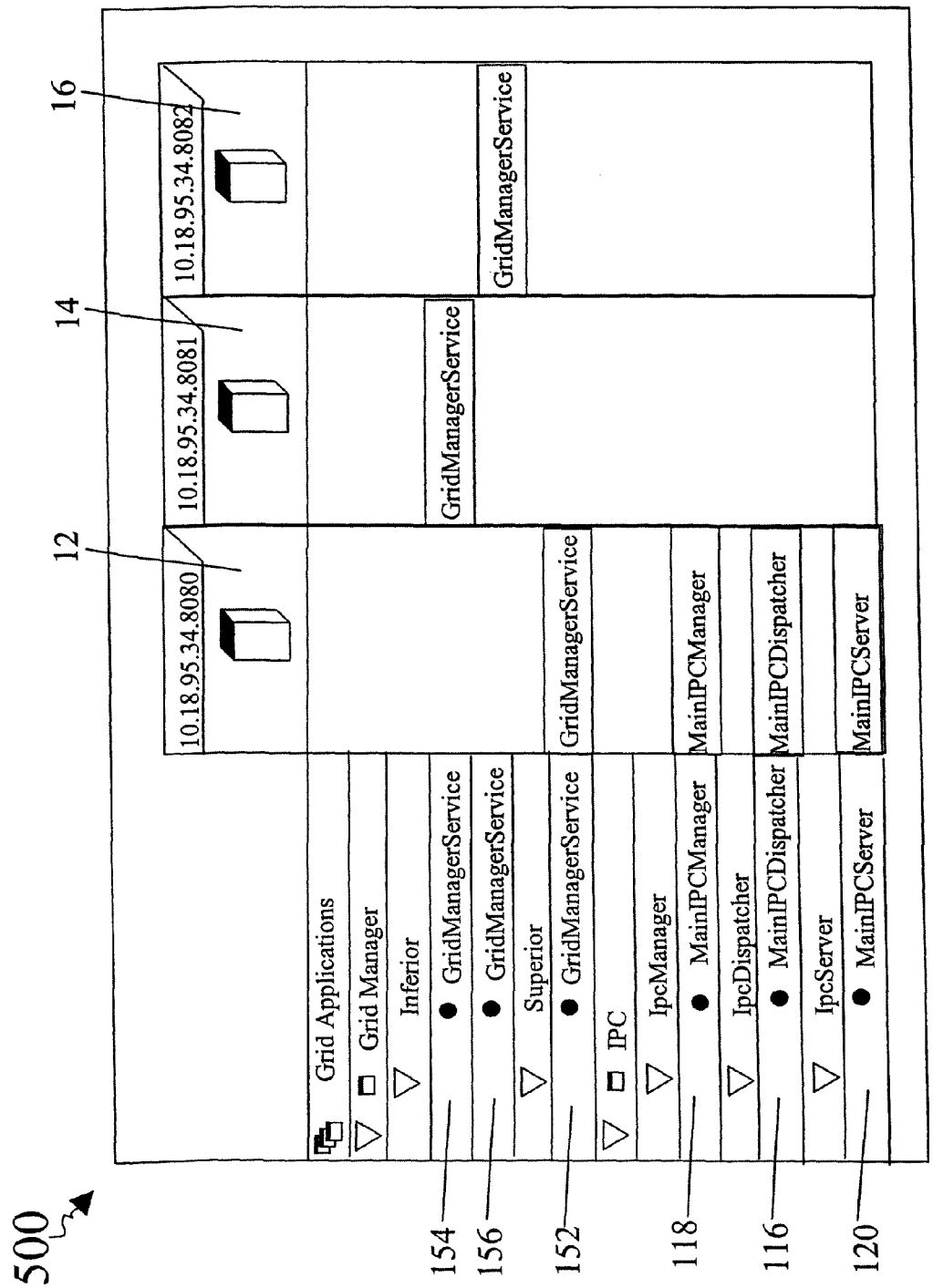
FIG. 6 is a block diagram of an exemplary a grid graphical user interface (GUI) component for visualization of a grid computing environment.

For administrators of grid computing environment 100, it is useful to visualize the applications and a grid manager on one computer device in the grid computing environment 100 as well as other computer devices running part of the grid management hierarchy in the form of grid managers with one or more levels of inferior relations to the grid manager. The view of these computer devices is referred to as a grid landscape. As shown in FIG. 6, a grid graphical user interface (GUI) 500 for visualization of a grid landscape, such as the grid computing environment 100, includes GUI-elements visualizing an organization of services running on computer devices. The GUI 500 provides a grid-like structure with columns and rows. Rows represent services, which in turn are structured hierarchically with respect to the application where a service belongs to, the type of the service, and the specific service instances. Each service instance row is associated with a place in the grid computing environment 100 representing where it is instantiated. In this context, columns represent the computer devices in the grid landscape. Specifically, GUI 500 has three columns representing three computer devices 12, 14, and 16. GUI 500 shows that grid manager 152 runs on computer device 12 with inferior grid managers 154 and 156 running on computer devices 14 and 16, respectively. GUI 500 also shows internet pricing configurator services running on computer device 12. These internet pricing configurator services include IPC dispatcher 116, IPC server 120, and IPC manager 118.

The GUI 500 is dynamically refreshed with feedback from the grid managers and internet pricing configurator (or other application) services so that new services appear in GUI 500 to an administrator. Similarly, services that are shut down are removed in GUI 500.

Figure 7:
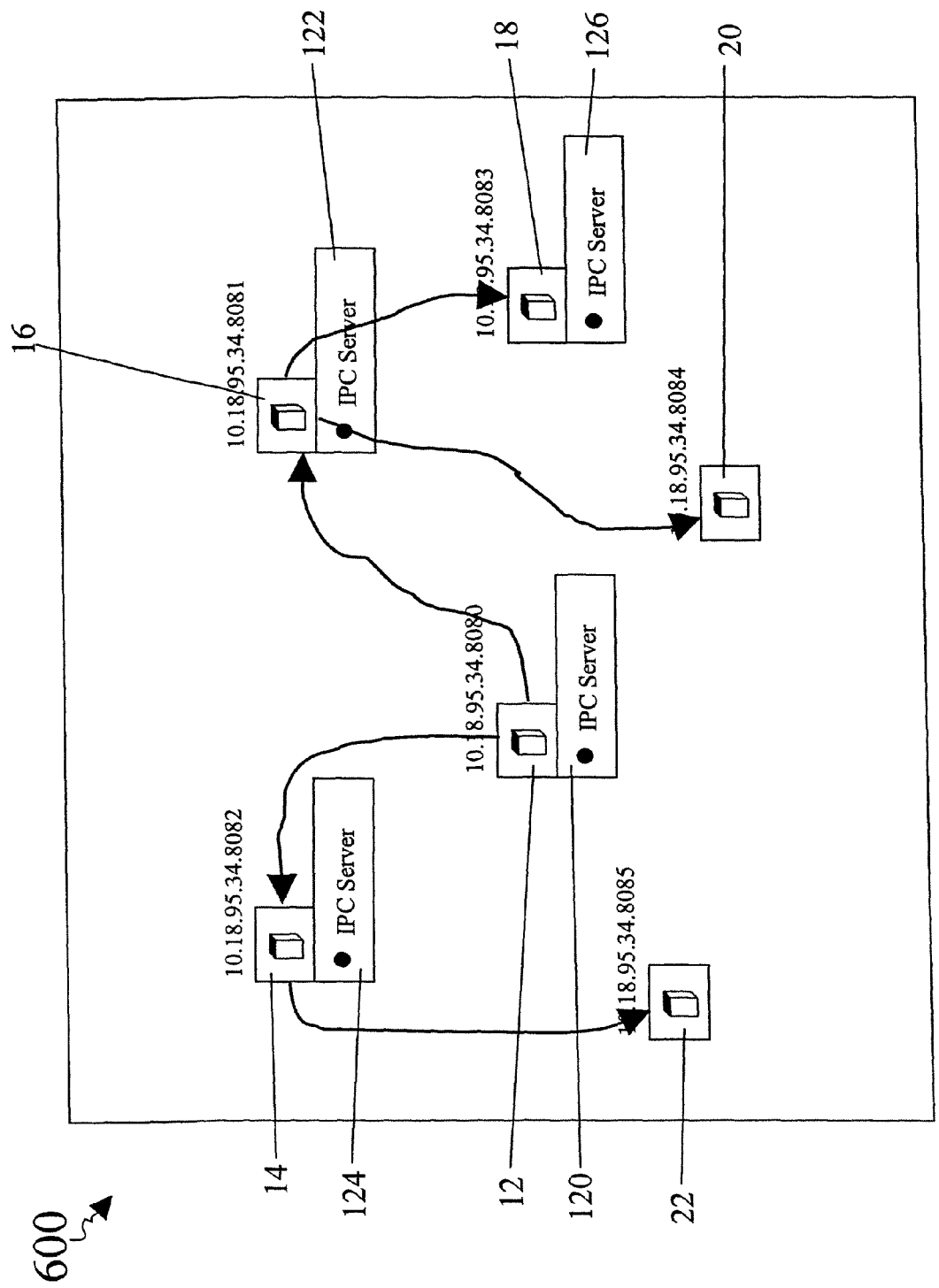
FIG. 7 is a block diagram of a grid browser component.

As shown in FIG. 7, a grid browser component 600 is a composite graphical user interface (GUI) for browsing grid managers on computer devices in the grid computing environment 100. The component 600 displays a graph with curved edges and vertices. Vertices represent computer devices in the grid computing environment 100 and curved edges represent the directional association of grid managers on two computer devices (vertices) in the grid computing environment 100. This association is hierarchical (i.e., superior/inferior). Each vertex displays the network address of a computer device as well as applications currently running on the computer device. For example, component 600 shows computer devices 12, 14, 16, 18, 20, and 22 with IPC servers 118, 120, 122, and 124. In other examples (not shown), the grid browser component 600 shows non-hierarchical, peer to peer associations of grid managers with non-directional edges representing the associations.

The grid browser component 600 is context sensitive. Depending on the relationship among the grid managers on the computer devices (e.g., superior/inferior), computer devices are traversed in respect to a user's browsing history.

By clicking on a vertex representing a computer device in GUI 600 (e.g., computer device 14), a user can automatically view a grid manager and applications running on the computer device and grid managers having inferior relations to the grid manager using GUI 500. The user can pick a computer device and see relations between its grid manager and other grid managers. This connection between GUIs 500 and 600 is done using software that generates GUIs 500 and 600.

The network 8 can be implemented in a variety of ways. The network 8 includes any kind and any combination of networks such as an Internet, a local area network (LAN) or other local network, a private network, a public network, a plain old telephone system (POTS), or other similar wired or wireless networks. Communications through the network 8 may be secured with a mechanism such as encryption, a security protocol, or other type of similar mechanism. Communications through the network 8 can include any kind and any combination of communication links such as modem links, Ethernet links, cables, point-to-point links, infrared connections, fiber optic links, wireless links, cellular links, Bluetooth®, satellite links, and other similar links.

The network 8 is simplified for ease of explanation. The network 8 can include more or fewer additional elements such as networks, communication links, proxy servers, firewalls or other security mechanisms, Internet Service Providers (ISPs), gatekeepers, gateways, switches, routers, hubs, client terminals, and other elements.

Computer devices 12, 14, 16, 18, 20, and 22 communicate over medium 10 using one of many different networking protocols. For instance, one protocol is Transmission Control Protocol/Internet Protocol (TCP/IP) combined with SOAP (Simple Object Access Protocol).

Embodiments of the invention can be implemented in digital electronic circuitry, or in computer hardware, firmware, software, or in combinations of them. Embodiment of the invention can be implemented as a computer program product, i.e., a computer program tangibly embodied in an information carrier, e.g., in a node-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of embodiments of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Other embodiments are within the scope of the following claims.

What is claimed is:

1. A method executed by at least one processor, the method comprising:
    starting, by the processor, a first service on a first computer, the first service managing a plurality of computational resources for one or more applications on a network;
    reading, by the first service, a file containing a first list of services having superior relation to the first service and a second list of services having inferior relation to the first service to determine that the first service has a first inferior relation to a second service running on a second computer, the first inferior relation indicating that the second service is configured to send a query for available computer resources to the first service;
    opening, by the processor, a communication channel from the first service to the second service based on the determined first inferior relation;
    receiving and responding to the query with a list of available computer resources on the first computer to the second computer;
    receiving a message to cancel the first service's first inferior relation to the second service;
    closing the communication channel from the first service to the second service in response to the message;
    receiving a message to generate a second inferior relation from the first service to a third service residing in a third computer, the second inferior relation indicating that the first service is configured to send a query for available computer resources to the third service;
    modifying the file based on the second inferior relation; and
    accepting an opening of a communication channel from the third service to the first service.

2. The method of claim 1 wherein the opening of the communication channel from the first service to the second service further comprises determining if the second service responds to the opening, and establishing the communication channel from the first service to the second service after a predetermined time period, if the second service does not respond to the opening.

3. The method of claim 1, wherein the first service manages the plurality of computational resources by performing at least one of locating, reserving, allocating, monitoring, or deallocating the plurality of computational resources.

4. The method of claim 1, wherein the opening of the communication channel from the first service to the second service further comprises receiving an acceptance of the opening of the communication channel from the first service to the second service.

5. The method of claim 1, further comprising establishing a communication channel from the second service to the third service.

6. A method executed by at least one processor, the method comprising:

starting an execution of a first service residing in a first computer, the first service managing one or more computational resources for one or more applications on a network;

starting, by the processor, an execution of a second service residing in a second computer;

reading, by the second service, a file containing a first list of services having superior relation to the second service and a second list of services having inferior relation to the second service to determine that the second service has a first inferior relation to the first service, wherein the first inferior relation indicates that the first service is configured to send a query for available computer resources to the second service;

establishing, by the processor, a first communication channel from the second service to the first service based on the determined first inferior relation;

receiving and responding to the query with a list of available computer resources on the second computer to the first computer;

establishing a second communication channel from the first service to the second service;

receiving, by the second service, a message to cancel the second service's first inferior relation with the first service;

closing the first communication channel in response to the message;

failing to respond to the second communication channel;

receiving a message to create a second inferior relation from the second service to a third service, the second inferior relation indicating that the second service is configured to send a query for available computer resources to the third service;

modifying the file based on the second inferior relation; and establishing a third communication channel initiated from the third service to the second service.

7. The method of claim 6, wherein the first service manages the one or more computational resources by performing at least one of locating, reserving, allocating, monitoring, or deallocating the one or more computational resources.

8. A system comprising:

two or more computers each configured to run a service, each of the service managing one or more computational resources for one or more applications;

a network configured such that a first service running on a first of the two or more computers has a superior relation to a second service running on a second of the two or more computers and the second service has an inferior relation to the first service, wherein the first inferior relation indicates that the first service is configured to send a query for a list of available resources on the second computer in the network and wait for a response to the query from the first service to the second service; and the second service is further configured to read a file containing a first list of services having superior relation to the second service and a second list of services having inferior relation to the second service to determine that the second service has the inferior relation to the first service, remove the inferior relation between the second service and the first service in response to a message to cancel the inferior relation to the first service, create a new superior relation with a third service, and modify the file based on the new superior relation.

9. The system of claim 8 wherein the superior relation to the second service comprises a first communication channel from the first service to the second service and the inferior relation comprises second communication channel from the second service to the first service.

10. The system of claim 8 wherein the first service is further configured to locate the one or more computational resources for the one or more applications by sending a query for available computational resources to the second service.

11. The system of claim 8, wherein each of the service configured to run on the two or more computers manages the one or more computational resources by performing at least one of locating, reserving, allocating, monitoring, or deallocating the one or more computational resources.

\* \* \* \* \*